(12) United States Patent
McGlynn et al.

(10) Patent No.: US 8,506,875 B2
(45) Date of Patent: *Aug. 13, 2013

(54) SINGLE SIDED SHUTTLE-TYPE BLOW MOLDING METHOD

(75) Inventors: Daniel McGlynn, Perrysburg, OH (US); Gregory A. Geisinger, Toledo, OH (US); Thomas J. Krall, Toledo, OH (US)

(73) Assignee: Graham Packaging Plastic Products, Inc., York, PA (US)

( * ) Notice: Subject to any disclaimer, the term of this patent is extended or adjusted under 35 U.S.C. 154(b) by 380 days.

This patent is subject to a terminal disclaimer.

(21) Appl. No.: 12/898,855

(22) Filed: Oct. 6, 2010

(65) Prior Publication Data

US 2011/0049771 A1    Mar. 3, 2011

Related U.S. Application Data

(60) Division of application No. 11/493,026, filed on Jul. 26, 2006, now Pat. No. 7,833,006, which is a continuation-in-part of application No. 11/128,435, filed on May 13, 2005, now abandoned, which is a continuation of application No. 10/810,986, filed on Mar. 25, 2004, now Pat. No. 6,893,602, which is a continuation of application No. 09/781,656, filed on Feb. 12, 2001, now Pat. No. 6,730,257.

(51) Int. Cl.
*B29C 49/04* (2006.01)

(52) U.S. Cl.
USPC ............ 264/542; 264/541; 264/523; 264/148

(58) Field of Classification Search
None
See application file for complete search history.

(56) References Cited

U.S. PATENT DOCUMENTS 6,730,257 B2 * 5/2004 Krall et al. .................... 264/509
6,893,602 B2 * 5/2005 Krall et al. .................... 264/509

\* cited by examiner

*Primary Examiner* — Monica Huson
(74) *Attorney, Agent, or Firm* — Stradley Ronon Stevens & Young, LLP

(57) ABSTRACT

A single-sided shuttle-type blow molding apparatus having an extruder for substantially continuously extruding a thermoplastic material in tubular form at a moldable temperature downwardly along a vertical axis. The apparatus includes a mold having a set of mold parts adapted to open and close relative to each other to define, when closed, a mold cavity. A shuttle having the mold mounted thereon is arranged to move along a closed path from a first position wherein the mold engages, when open, a finite length of the thermoplastic tube, to a second position away from the first position. The apparatus further includes a blow head adapted to blow the finite length of the thermoplastic tube to form the container as the mold moves from the first position to the second position of the closed path. The apparatus includes no more than one mold. A method is also described.

20 Claims, 6 Drawing Sheets

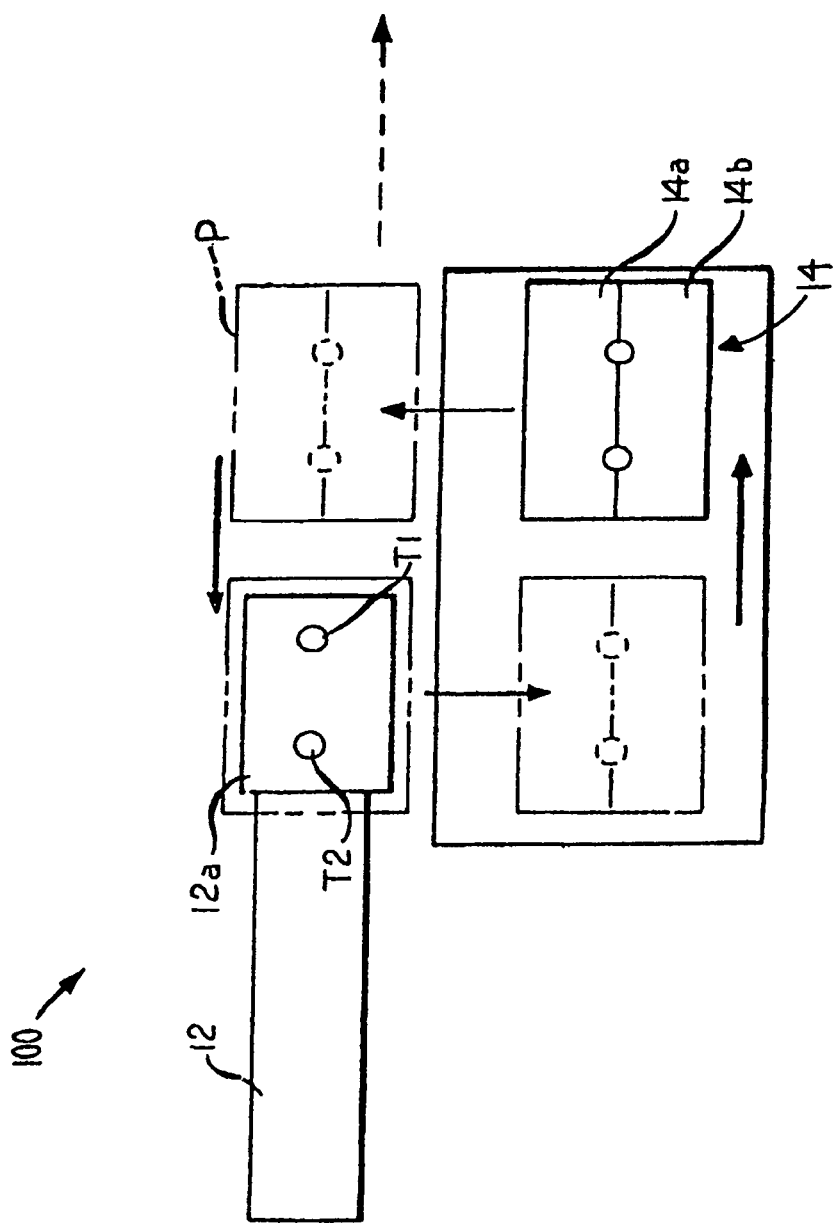

SINGLE SIDED SHUTTLE-TYPE BLOW MOLDING METHOD

CROSS REFERENCE TO RELATED APPLICATIONS

This application is a divisional of application Ser. No. 11/493,026, filed Jul. 26, 2006, now U.S. Pat. No. 7,833,006, which is a continuation-in-part of application Ser. No. 11/128,435, now abandoned, filed May 13, 2005, which is a continuation of application Ser. No. 10/810,986, filed Mar. 25, 2004, now U.S. Pat. No. 6,893,602, which is a continuation of application Ser. No. 09/781,656, filed Feb. 12, 2001, now U.S. Pat. No. 6,730,257, each of which is incorporated herein by reference in its entirety.

BACKGROUND OF THE INVENTION

1. Field of the Invention

This invention relates to a method of, and apparatus for, blow molding hollow articles of a thermoplastic material. More particularly, this invention relates to a method of, and apparatus for, blow molding hollow containers of a thermoplastic material.

2. Related Art

The production of thermoplastic containers by shuttle blow molding is described, for example, in U.S. Pat. No. 3,614,807 (Lagoutte). In shuttle blow molding, two or more sets of blow molds, each of which is made up of a pair of mold halves that open and close relative to each other, are moved, in sequence, to engage an extruded tube of thermoplastic material at a moldable temperature, or a spaced apart plurality of such tubes in equipment used to simultaneously manufacture a plurality of containers in each mold set. Each mold set is then moved away to a station where the portion of the tube in the mold set is blown into its desired configuration, as determined by the configuration of a cavity that is defined by the halves of the mold set, the movement of each mold set according to the aforesaid '807 patent involving a first motion coaxial with the extruded tube to stretch the tube to properly size it and/or to axially orient material therein. The halves of the mold set are then opened to permit removal of the blown article, and the mold set is then returned to grasp another section of the extruded tube or tubes for a repeat of the process. The mold sets of a given shuttle blow molding machine move in predetermined paths relative to one another so that sequential portions of the extruded tube are usually grasped by one or another of the mold sets, without the need to employ intermittent extrusion of the thermoplastic tube or tubes.

In the manufacture of containers by shuttle blow molding it has become popular to apply labels to the containers, by introducing a label or an opposed pair of labels, into the open molds before the parison(s) are engaged thereby, by equipment that applies labels to the interiors of the open mold halves, and this equipment is generally described as in-mold labeling equipment. Known types of in-mold labeling equipment have the capacity to feed labels to the mold sets of a shuttle blow molding machine at a rate equal to the total of the production rates of all mold sets of the shuttle blow molding machine. Unfortunately, however, some of the known types of shuttle blow molding machines position the various mold sets at different positions from one another while containers are being blown therein. This, then, requires an in-mold labeling machine for each mold set, notwithstanding that the total capacity of the multiple in-mold labeling machines for a given shuttle blow molding machine far exceeds the molding capacity of all the mold sets of the machines. The use of an in-mold labeling device in connection with a shuttle blow molding machine is described, for example, in U.S. Pat. No. 4,769,205 (Oles et al.) and in U.S. Pat. No. 5,919,498 (Weber). Further, an in-mold labeling device in connection with an injection blow molding machine is described in commonly assigned U.S. Pat. No. 4,808,366 (Kaminski et al.), the disclosure of which is incorporated by reference herein.

Another disadvantage of known types of shuttle blow molding machines that applies even when the machine is not being used to apply labels to the containers in the mold is that article removal equipment must be provided for each mold set, because the article removal positions of the various mold sets differ from one another. A shuttle blow molding machine that employs four (4) mold sets is described in International Patent Application Serial No. PCT/U.S.00/26497. However, there are many shuttle blow molding operations that do not require the full productive capacity of a four-mold machine.

SUMMARY OF THE INVENTION

An apparatus for blow molding a container from a thermoplastic material is provided. The apparatus comprises extruder means for continuously extruding a tube of the thermoplastic material downwardly along a vertical axis. The apparatus further includes a mold having a set of mold parts adapted to open and close relative to each other to define, when closed, a mold cavity. The apparatus further includes means for moving the mold along a closed path from a first position wherein the mold engages, when open, a finite length of the thermoplastic tube, to a second position away from the first position. The apparatus further includes means for blowing the finite length of the thermoplastic tube to form the container as the mold moves from the first position to the second position of the closed path. The apparatus includes no more than one mold.

A method of blow molding a container from a thermoplastic material is provided. The method comprises the steps of: substantially continuously extruding a tube of thermoplastic material downwardly along a vertical axis; engaging a finite length of the thermoplastic material in a mold at a first position of the mold; moving the mold outwardly and downwardly from the first position along a first portion of a closed path; blowing the finite length of thermoplastic material within the mold to form a blown container; and removing the blown container from the mold at a second position of the closed path, the second position being spaced substantially horizontally away from the first position. The method further includes using no more than one mold.

An apparatus for blow molding a container from a thermoplastic material is provided. The apparatus comprises an extruder adapted to continuously extrude a tube of the thermoplastic material downwardly along a vertical axis. The apparatus further includes a mold having a set of mold parts adapted to open and close relative to each other to define, when closed, a mold cavity. The apparatus further includes a shuttle having the mold mounted thereon and being arranged to move along a closed path from a first position wherein the mold engages, when open, a finite length of the thermoplastic tube, to a second position away from the first position. The apparatus further includes a blow head adapted to blow the finite length of the thermoplastic tube to form the container as the mold moves from the first position to the second position of the closed path. The apparatus includes no more than one mold.

BRIEF DESCRIPTION OF THE SEVERAL VIEWS OF THE DRAWINGS

FIG. 6 is a schematic plan view of a single-sided apparatus according to another exemplary embodiment of the present invention for practicing a method according to another exemplary embodiment of the present invention.

DETAILED DESCRIPTION OF THE SEVERAL EMBODIMENTS OF THE INVENTION

Figure 1:
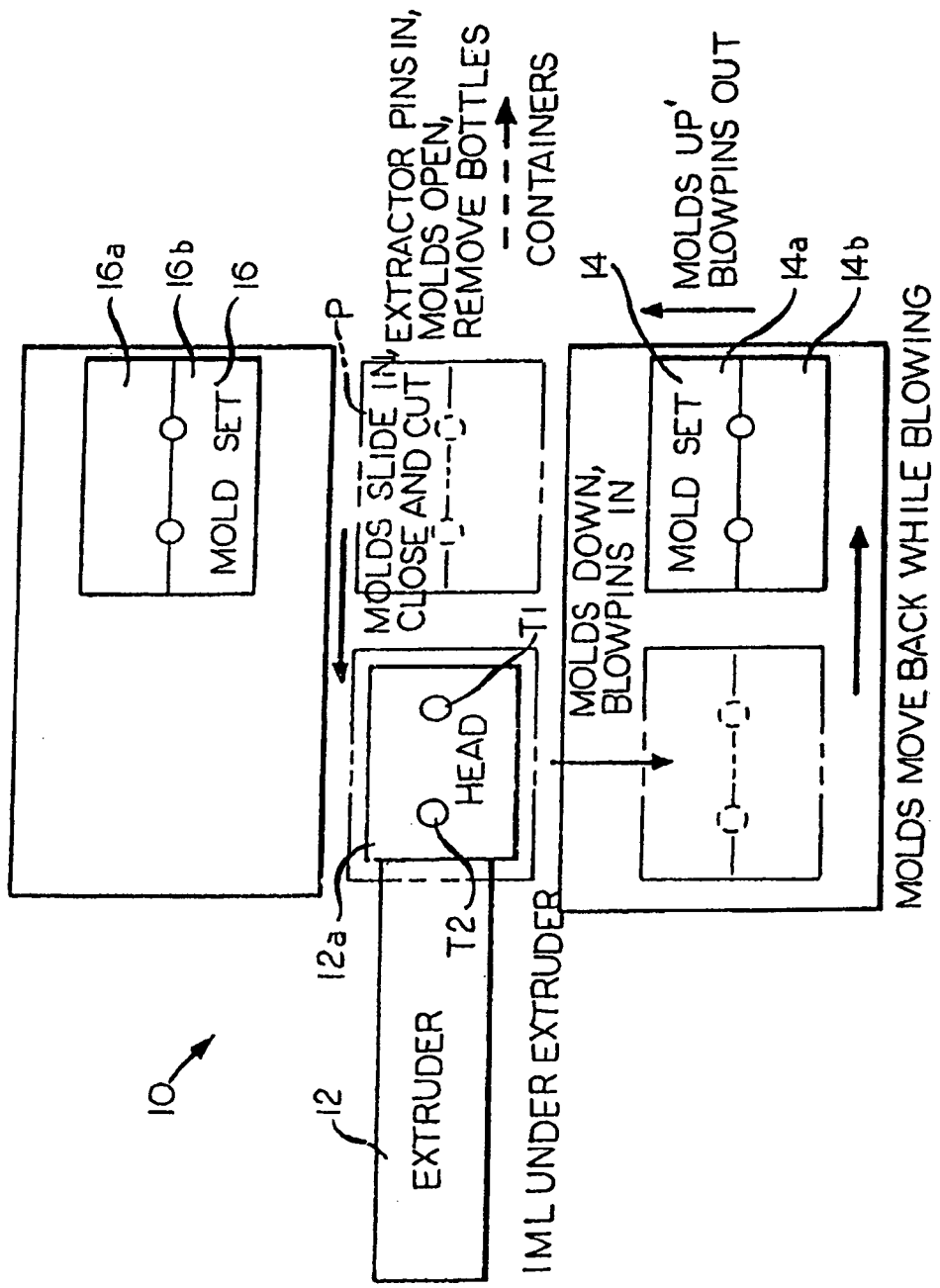
FIG. 1 is a schematic plan view of an apparatus according to an exemplary embodiment of the present invention for practicing a method according to an exemplary embodiment of the present invention.
Figure 2:
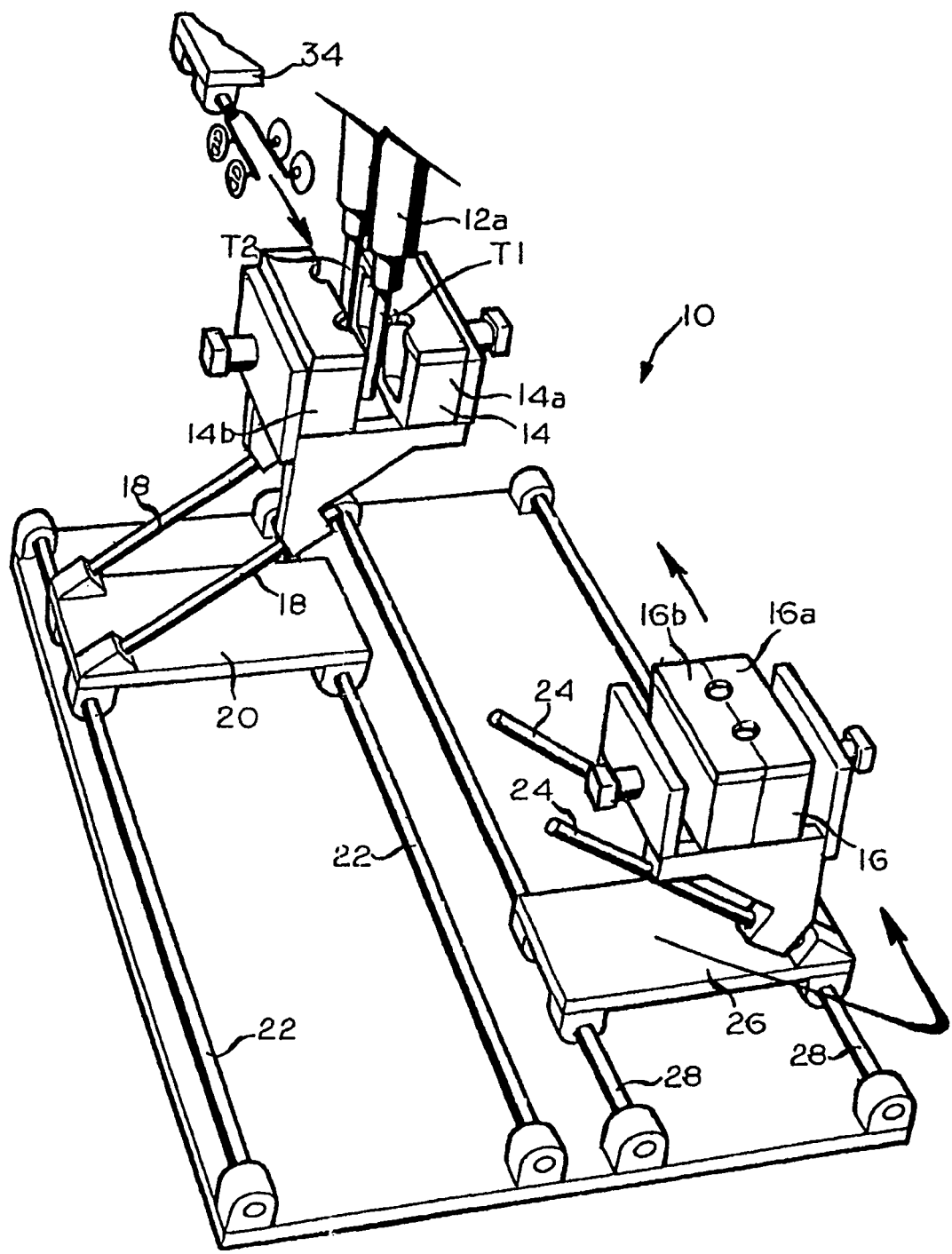
FIG. 2 is a perspective view of the apparatus according to FIG. 1 at a step in the practice of the method.

A shuttle-type blow molding apparatus according to an exemplary embodiment of the present invention is indicated generally by reference numeral 10 in FIGS. 1-4. The apparatus of 10 includes an extruder 12 that substantially continuously downwardly extrudes a spaced apart pair of tubes T1, T2 of thermoplastic material at a temperature sufficiently high to permit finite lengths of each such tube to be blown into containers or other useful hollow articles. The blowing of successive lengths of each of the tubes T1, T2 is done sequentially by a pair of mold sets 14, 16, which may be of conventional construction. Each mold set 14 is made up of a pair of mold halves 14a, 14b, which open and close with respect to one another to define, when closed, mold cavities in which lengths of the tubes T1, T2 are blown into the desired articles. Likewise, each mold set 16 is made up of a pair of mold halves 16a, 16b, which open and close with respect to one another to define, when closed, mold cavities in which successive lengths of the tubes T1, T2 are blown into the desired articles. While the simultaneous molding of articles from tubes T1, T2 is described, it is to be understood that it is contemplated that the apparatus 10 can be used to produce only one article at a time from a single extruded tube, or multiple articles from each tube, and to produce one or more articles at a time from each of three or more extruded tubes.

The mold set 14 is mounted on a pair of spaced apart, inclined slides 18 for movement outwardly and downwardly from a position beneath the extruder head 12a. In any case, the shuttle 26 is mounted for movement in a horizontal plane on a pair of spaced apart slides 28 from a position aligned in a vertical plane with the extruder head 12a to a position horizontally removed therefrom.

Figure 3:
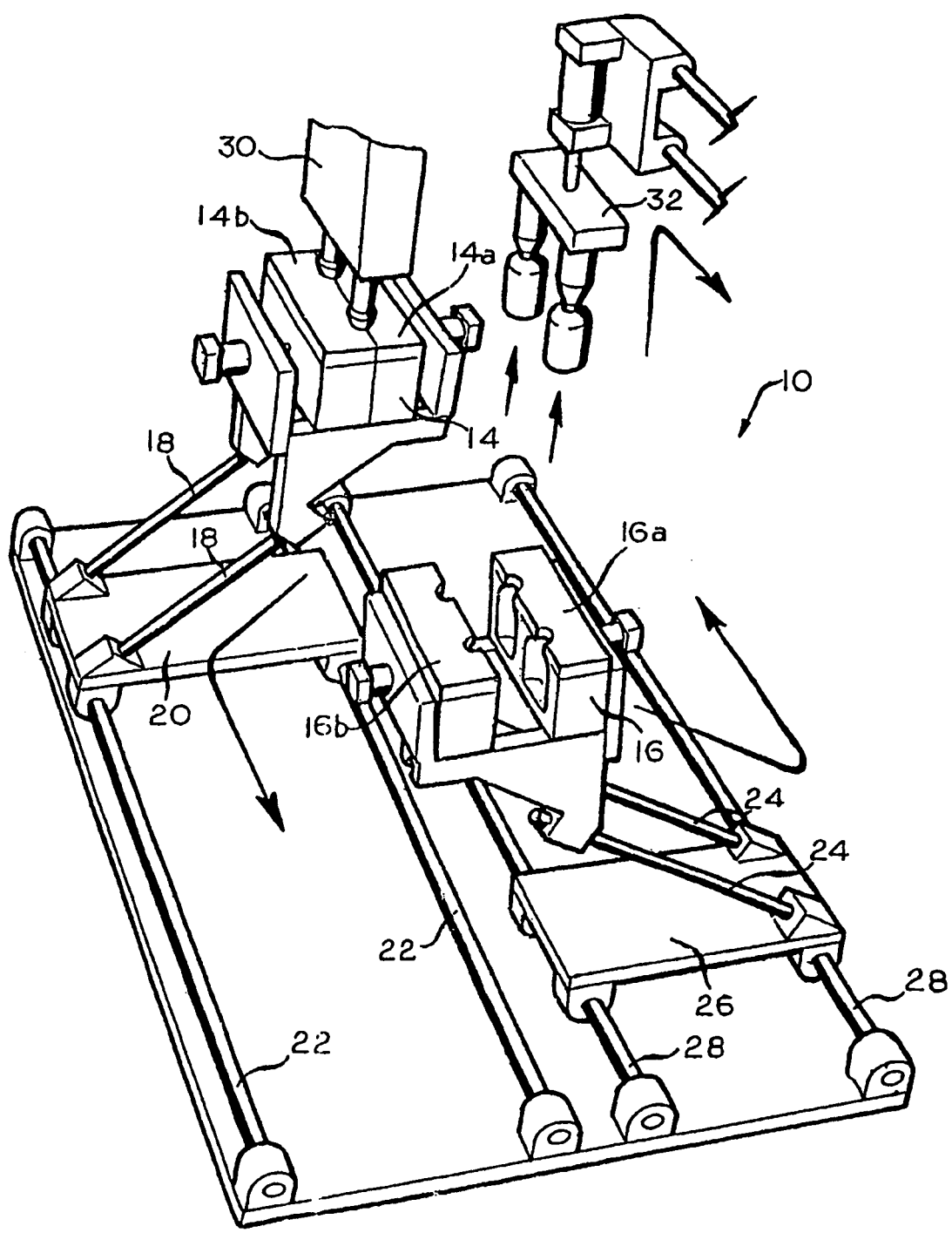
FIG. 3 is a perspective view of the apparatus according to FIG. 2 at another step in the practice of the method.
Figure 4:
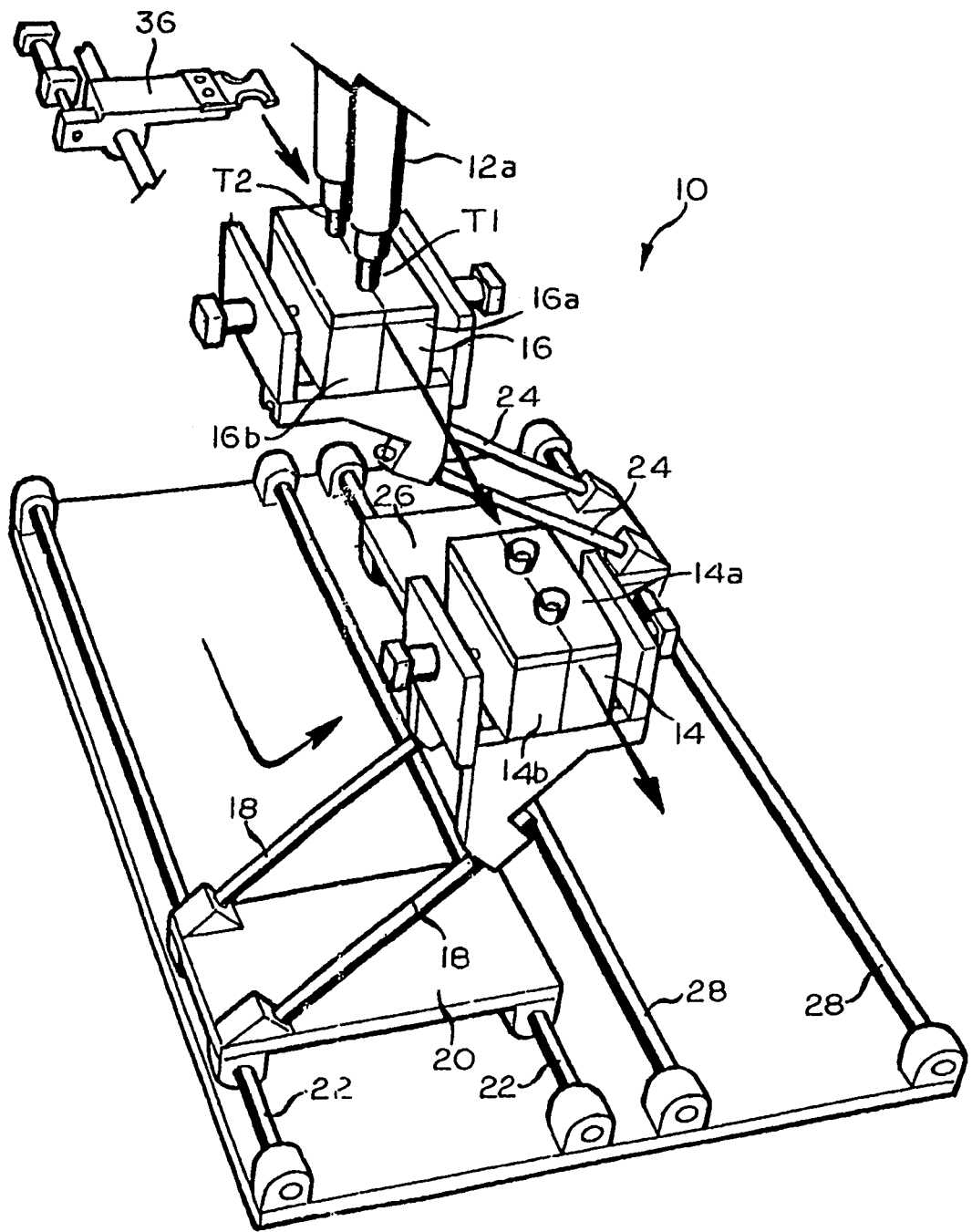
FIG. 4 is a perspective view of the apparatus of FIG. 2 at yet another step in the practice of the method.

After each of the mold sets 14, 16 receives and closed around lengths of extruded tubes T1, T2, a blow head, shown in FIG. 3 as the blow head 30 for the mold set 14, aligns itself with the lengths of the tubes T1, T2 therein. The blow head 30 travels with the mold set 14 as the mold set 14 moves rearwardly with the shuttle 20, and injects blowing air or other fluid into the lengths of the tubes T1, T2 in the closed mold set 14 to blow such lengths into finished articles.

When or shortly before the mold sets 14, 16 reach their rearmost positions on the slides 22, 28, respectively, the blow head associated therewith is removed therefrom and such mold sets 14, 16 are then sequentially moved upwardly and inwardly on the slides 18, 24, respectively, to take-out position, shown as the position P in FIG. 1. Then the mold sets 14, 16 are opened and a take-out device engages the blown containers or other articles in the mold sets 14, 16 to remove completed articles therefrom. As is clear from FIG. 1, the position P is the same for each of the mold sets 14, 16, which allows for the use of a single take-out device 32 for both of the mold sets 14, 16. Further, the position P is away from a position beneath the extruder head 12a, for a reason which will be subsequently described in more detail. In any case, the shuttle 20 or the shuttle 26, on which the mold set 14 or the mold set 16 is mounted, is then moved toward a position beneath the extruder head 12a to begin a repeat of the cycle in connection with subsequent finite lengths of the extruded tubes T1, T2.

When it is desired to prelabel containers being produced by the blow molding apparatus 10, and in-mold labeling device 34 is provided to introduce a label, or an opposed pair of labels, into the mold sets 14, 16 while the mold halves 14a, 14b or 16a, 16b are in a position beneath the extruder head 12a, but while such mold sets are still open. In that regard, an in-mold labeling device in connection with a shuttle blow molding machine is described, for example, in U.S. Pat. No. 4,769,205 (Oles et al.). In any case, it is important that the position at which labels are introduced into the mold sets 14, 16, which is sequentially the same for each of the mold sets 14, 16, be different than the position P at which articles are removed from the mold sets 14, 16, to minimize problems in trying to position multiple devices at the same position on the blow molding apparatus 10.

If it is desired to positively sever lengths of the extruded tubes T1, T2 from successive positions of such tubes, a retractable cut-off knife 36 (FIG. 4) is provided to sever the tubes T1, T2 after lengths thereof have been positively grasped by the mold set 14 or mold set 16, as the case may be. In any case, the downward movement of the mold sets 14, 16 during the outward movement of its mold sets aids in severing the grasped lengths of the tubes T1, T2 from the portions above such grasped lengths.

Figure 5:
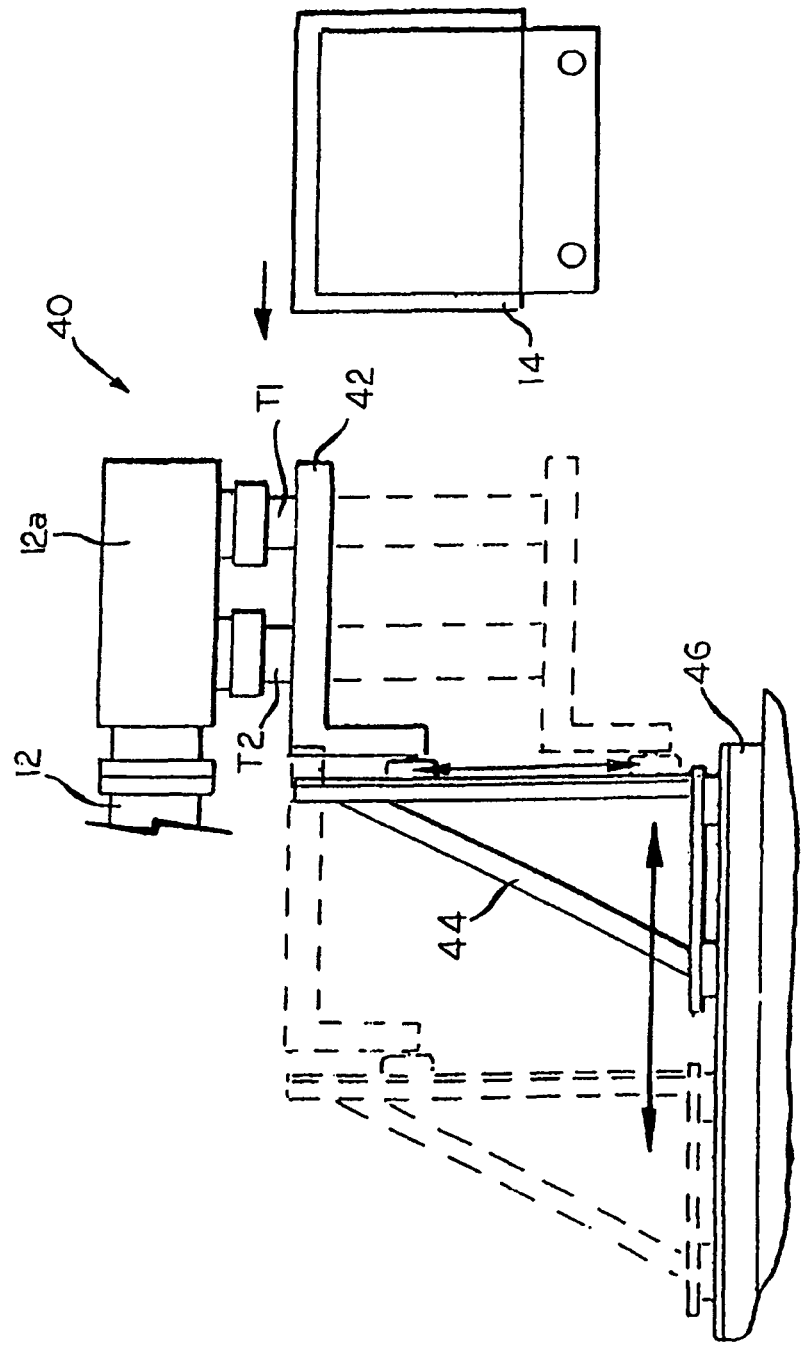
FIG. 5 is a schematic elevation view of a device that may usefully be employed in certain situations in conjunction with the apparatus according to FIGS. 1-4.

FIG. 5 illustrates a device, generally identified by reference numeral 40, for capturing the extruded tubes T1, T2 before they are grasped by the mold sets 14, 16, and for securely engaging the extruded tubes T1, T2 while the mold sets 14, 16 are closing around them. This may be useful, for example, to stretch the extruded tubes T1, T2 to reduce the wall thickness thereof from their extruded thicknesses, or to control the positions of the extruded tubes T1, T2, which are otherwise free to swing relative to the mold sets 14, 16, while they are being engaged by the mold sets 14, 16. This factor becomes more important as the lengths of the tubes engaged by the mold sets 14, 16 increases. In any case, the device 40 includes a vertically reciprocal clamp 42 that grasps the tubes T1, T2 at locations just below the extruder head 12a. The clamp 42 then moves downwardly on a frame 44 to a position below the position at which the mold set 14 or 16, as the case may be, grasps the tubes T1, T2. The clamp 42 then releases the extruded tubes T1, T2, and the frame 44 is moved rearwardly on slides 46 to a position where the clamp 42 is out of alignment with the tubes T1, T2. Then, the clamp 42 is moved upwardly to its extruded tube grasping position to grasp subsequent lengths of the tubes T1, T2, and the frame 44 is then moved inwardly, after opening the clamp 42, to permit the clamp 42 to grasp such lengths after the mold set 14 or 16 has moved out of its tube grasping position.

FIG. 6 is a schematic plan view of a single-sided shuttle-type blow molding apparatus, generally indicated by reference numeral 100, for practicing a method according to another exemplary embodiment of the present invention. The single-sided shuttle-type blow molding apparatus 100 depicted in FIG. 6 is the same as the shuttle-type blow molding apparatus 10 described above except that the apparatus 100 includes mold set 14 on only one side thereof. The single-sided shuttle-type blow molding apparatus 100 can provide lower tooling costs as well as less complexity and quicker product changeover relative to multiple-sided shuttle-type blow molding apparatuses 10. In terms of reducing complexity, the single-sided shuttle-type blow molding apparatus 100 does not require synchronization of multiple shuttles and/or mold sets and requires less clearance at the various mold set positions than systems with multiple sides. The single-sided shuttle-type blow molding apparatus 100 can further allow greater access to the mold set 14, shuttle 20, slides 18, and/or slides 22 during operation for on-the-fly adjustments.

Although the best mode contemplated by the inventors for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

We claim:

1. A method of blow molding a container from a thermoplastic material, the method comprising: substantially continuously extruding a tube of thermoplastic material downwardly along a vertical axis; engaging a finite length of the tube in a mold mounted on a shuttle at a first position of a closed path; moving the mold outwardly and downwardly from the first position along a first portion of the closed path; moving the shuttle away from the first position to a second position of the closed path along a second portion of the closed path extending substantially parallel to a longitudinal axis extending between the first position and the second position of the closed path; and blowing the finite length of the tube within the mold to form a blown container as the shuttle moves from the first position to the second position of the closed path.

2. The method according to claim 1, further comprising applying a label to a cavity of the mold when the mold is at the first position.

3. The method according to claim 1, further comprising moving the mold along a third portion of the closed path, the third portion of the closed path extending inwardly and upwardly from the second portion to the second position.

4. The method according to claim 3, further comprising moving the mold along a fourth portion of the closed path, the fourth portion of the closed path extending substantially horizontally along the longitudinal axis between the second position and the first position.

5. The method according to claim 1, further comprising grasping the extruded length of the tube with a device separate from the mold before the finite length of the tube is engaged by the mold; moving the device downwardly; releasing the tube from the device; and withdrawing the device from the tube.

6. The method according to claim 1, wherein the second position is substantially horizontally spaced from the first position.

7. The method according to claim 6, wherein the second position and the first position are at substantially the same elevation.

8. The method according to claim 1, wherein no more than one mold is used.

9. The method according to claim 1, further comprising severing the extruded tube using a retractable cut-off knife.

10. The method according to claim 1, wherein the mold is mounted to the shuttle via a pair of inclined slides for moving the mold outwardly and downwardly.

11. The method according to claim 5, wherein the device is a vertically reciprocal clamp.

12. A method of blow molding a container from a thermoplastic material, comprising: substantially continuously extruding a tube of thermoplastic material downwardly along a vertical axis; engaging a finite length of the tube in a mold mounted on a shuttle at a first position of a closed path; moving the mold outwardly and downwardly from the first position along a first portion of the closed path; moving the shuttle away from the first position to a second position of the closed path along a second portion of the closed path extending substantially parallel to a longitudinal axis extending between the first position and the second position of the closed path; blowing the finite length of the tube within the mold to form a blown container as the shuttle moves from the first position to the second position of the closed path; removing the blown container from the mold at the second position of the closed path; moving the mold inwardly and upwardly from the second portion to the second position along a third portion of the closed path; and moving the shuttle away from the second position toward the first position along a fourth portion of the closed path.

13. The method according to claim 12, further comprising applying a label to a cavity of the mold when the mold is at the first position.

14. The method according to claim 12, wherein the second position is substantially horizontally spaced from the first position.

15. The method according to claim 14, wherein the second position and the first position are at substantially the same elevation.

16. The method according to claim 12, wherein no more than one mold is used.

17. The method according to claim 12, further comprising severing the extruded tube using a retractable cut-off knife.

18. The method according to claim 12, wherein the mold is mounted to the shuttle via a pair of inclined slides for moving the mold outwardly and downwardly.

19. The method according to claim 12, further comprising grasping the extruded length of the tube with a device separate from the mold before the finite length of the tube is engaged by the mold; moving the device downwardly; releasing the tube from the device; and withdrawing the device from the tube.

20. The method according to claim 19, wherein the device is a vertically reciprocal clamp.

* * * * *